(12) United States Patent
Kainz et al.

(10) Patent No.: US 9,303,184 B2
(45) Date of Patent: Apr. 5, 2016

(54) POLYCARBONATE COATINGS FOR METAL PACKAGING

(71) Applicant: Dow Global Technologies LLC, Midland, MI (US)

(72) Inventors: Bernhard Kainz, Lauf (DE); Jonathan D. Moore, Midland, MI (US); Mark F. Sonnenschein, Midland, MI (US); Benjamin L. Wendt, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 21 days.

(21) Appl. No.: 14/062,968

(22) Filed: Oct. 25, 2013

(65) Prior Publication Data

US 2014/0116915 A1 May 1, 2014

Related U.S. Application Data

(60) Provisional application No. 61/720,511, filed on Oct. 31, 2012.

(51) Int. Cl.
| | |
|---|---|
| C08G 18/42 | (2006.01) |
| C07C 69/76 | (2006.01) |
| B05D 3/02 | (2006.01) |
| B32B 27/36 | (2006.01) |
| B65D 85/84 | (2006.01) |
| C09D 169/00 | (2006.01) |
| B65D 85/00 | (2006.01) |
| C08L 69/00 | (2006.01) |
| C08G 64/02 | (2006.01) |
| C08G 64/30 | (2006.01) |

(52) U.S. Cl.
CPC .............. *C09D 169/00* (2013.01); *B65D 85/70* (2013.01); *C08L 69/00* (2013.01); *C08G 64/02* (2013.01); *C08G 64/305* (2013.01); *Y10T 428/31507* (2015.04)

(58) Field of Classification Search
None
See application file for complete search history.

(56) References Cited

U.S. PATENT DOCUMENTS

| | | |
|---|---|---|
| 2004/0191498 A1 | 9/2004 | White et al. |
| 2006/0188738 A1 | 8/2006 | Jennings et al. |
| 2006/0293468 A1 | 12/2006 | Rische et al. |
| 2007/0036903 A1 | 2/2007 | Mayr et al. |
| 2011/0293844 A1 | 12/2011 | Kasai et al. |
| 2012/0041143 A1 | 2/2012 | Zhou et al. |

FOREIGN PATENT DOCUMENTS

| | | |
|---|---|---|
| JP | 2006206774 A | 8/2006 |
| WO | 2009012391 A1 | 1/2009 |
| WO | 2010028362 A1 | 3/2010 |
| WO | 2010100121 A1 | 9/2010 |
| WO | 2011035178 A1 | 3/2011 |
| WO | 2011129940 A1 | 10/2011 |
| WO | 2012036699 A1 | 3/2012 |

OTHER PUBLICATIONS

Dynapol® LS 615 and Dynapol® L952 Product Literature, Evonik Industries, 2006, pp. 1-28.

*Primary Examiner* — Susannah Chung
*Assistant Examiner* — Robert T Butcher
(74) *Attorney, Agent, or Firm* — Karl E. Stauss

(57) ABSTRACT

A liquid polycarbonate coating composition including an aliphatic polycarbonate resin and a cross linking compound, said aliphatic polycarbonate resin being derived from, in the presence of a catalyst, an aliphatic polyol which comprises (a) from 50 to 100% by weight of the aliphatic polyol, one or more cycloaliphatic polyols that consist essentially of primary hydroxyl groups and (b) from 0 to 50% by weight of the aliphatic polyol, one or more linear aliphatic polyols, is provided. A method of coating a substrate with the liquid polycarbonate coating composition and the resulting articles are also provided.

12 Claims, No Drawings

POLYCARBONATE COATINGS FOR METAL PACKAGING

This invention relates to thermosetting liquid coating compositions for metal packaging that exhibit good adhesion, chemical resistance, flexibility, weatherability and hydrolytic stability. In particular, this invention relates to polycarbonate coating compositions derived from cycloaliphatic primary polyols.

The application of various treatment and pretreatment solutions to metal substrates to retard or inhibit corrosion is well known. Coatings are typically applied to the interior surface of metal food and/or beverage containers, e.g. cans, as well as non-food metal containers, to prevent the contents from contacting the metal parts of the container. Contact between the to metal surface and the food and/or beverage as well as non-food substances can lead to corrosion of the metal container, which can then contaminate the contents thereof. In addition to corrosion protection, coatings for food and/or beverage cans should be non-toxic and inert, and, if applied to the internal surface, should not adversely affect the taste or appearance of the food and/or beverage in the can or contribute to a contamination of such contents. Various coatings such as epoxy-based, polyvinyl chloride-based, and polyester-based coatings have been used to coat the interior of metal cans to prevent corrosion.

Epoxy resins with bisphenol A (BPA) have been used in metal food packaging for decades. However, there is interest in coating compositions that do not add BPA containing materials, including materials that may contain residual levels of BPA. Solvent-borne metal packaging coating formulations that use polyester resins of high molecular weight as binder molecules are known to provide exceptionally high flexibility on metal substrates. However, polyester-based coatings have traditionally suffered from poor performance for chemical resistance and/or retort tests under severe conditions that simulate very aggressive food environments. Current flexible aliphatic polyesters (e.g. Dynapol® LS 615 from Evonik Industries AG, Hanau-Wolfgang, Germany) are used in combination with resins having aromatic content (e.g. Dynapol® L952 from Evonik Industries AG, Hanau-Wolfgang, Germany). The aromatic rings provide the retort resistance and hydrolytic stability that the aliphatic polyesters do not. Coating manufacturers would like to have a resin that matches or exceeds the flexibility, chemical resistance, and retort performance of polyester resins in a high solids formulation without use of BPA containing materials. Polyesters of carbonic acid with polyols, also described as polycarbonate polyols, have been described for use in metal packaging coatings, either in pure form as aliphatic polycarbonate polyols or as building blocks of further advanced resins to improve the properties of resulting coatings. However, such resins exhibit poor hydrolytic stability.

U.S. Patent Publication 2012/0041143 A1 describes a thermosetting coating composition comprised of an aliphatic polycarbonate resin and a cross linker. The aliphatic polycarbonate resins are derived from a mixture of hydroxyl-containing compounds including 2,2,4,4-tetramethyl-1,3-cyclobutanediol (TMCD) and 1,4-cyclohexane dimethanol (CHDM). However, use of diols with secondary hydroxyls (e.g. TMCD) makes the cycloaliphatic polyol synthesis difficult.

There is a need for metal can coatings that are easy to synthesize and can provide improved properties such as good adhesion, chemical resistance, flexibility, weatherability and hydrolytic stability without the use of BPA containing materials.

The present invention provides a liquid polycarbonate coating composition comprising an aliphatic polycarbonate resin and a cross linking compound, said aliphatic polycarbonate resin being derived from, in the presence of a catalyst, an aliphatic polyol which comprises (a) from 50 to 100% by weight of the aliphatic polyol, one or more cycloaliphatic polyols that consist essentially of primary hydroxyl groups and (b) from 0 to 50% by weight of the aliphatic polyol, one or more linear aliphatic polyols. The present invention further provides a method of coating a substrate comprising: (i) preparing a liquid polycarbonate coating composition comprising an aliphatic polycarbonate resin and a cross linking compound, said aliphatic polycarbonate resin being derived from, in the presence of a catalyst, an aliphatic polyol which comprises (a) from 50 to 100% by weight of the aliphatic polyol, one or more cycloaliphatic polyols that consist essentially of primary hydroxyl groups and (b) from 0 to 50% by weight of the aliphatic polyol, one or more linear aliphatic polyols; (ii) applying the liquid polycarbonate coating composition onto a substrate; and (iii) curing the coating composition.

The term "polyol" is an alcohol molecule containing multiple hydroxyl groups. The term "primary alcohol" or "primary hydroxyl group" means an alcohol which has the hydroxyl group connected to a primary carbon atom, such as for example, a molecule containing a —$CH_2OH$ group. A "BPA containing" material is any material that incorporates BPA or comprises residual amounts of BPA.

The aliphatic polycarbonate resin of the present invention is derived from, in the presence of a catalyst, an aliphatic polyol which comprises (a) from 50 to 100% by weight of the aliphatic polyol, one or more cycloaliphatic polyols that consist essentially of primary hydroxyl groups and (b) from 0 to 50% by weight of the aliphatic polyol, one or more linear aliphatic polyols. Preferably, the aliphatic polyol comprises (a) from 70 to 100% by weight of the aliphatic polyol, one or more cycloaliphatic polyols that consist essentially of primary hydroxyl groups and (b) from 0 to 30% by weight of the aliphatic polyol, one or more linear aliphatic polyols. More preferably, the aliphatic polyol comprises (a) from 85 to 100% by weight of the aliphatic polyol, one or more cycloaliphatic polyols that consist essentially of primary hydroxyl groups and (b) from 0 to 15% by weight of the aliphatic polyol, one or more linear aliphatic polyols.

It is preferable to omit all aliphatic polyols which comprise secondary hydroxyl to groups in the preparation of aliphatic polycarbonates, as such materials complicate the synthesis process and increase costs. For example, it is known from the Journal of Applied Polymer Science (1960) Vol 4, 207-211, that the reaction rate difference is a minimum of three times slower for secondary vs primary hydroxyls depending on steric factors and from the Flory Selected Works Vol 1 copyright 1975, where the 1/3 to 2/3 ratio is given explicitly. In addition to reaction rates, preparation of aliphatic polyols which comprise secondary hydroxyl groups require specialized process conditions. For example, US Patent Publication 2006/0004176 A1 to Hofacker recites the use of multiple steps, elevated temperatures, specific catalysts and long reaction times to name a few of the requirements. Such specialized process conditions increase costs and slow production rates. If aliphatic polyols which comprise secondary hydroxyl groups are used in the preparation of aliphatic polycarbonates, such use should be no more than 5%, preferably no more than 2.5%, most preferably no more than 1%, by weight based on the aliphatic polyols.

Examples of cycloaliphatic polyols that consist essentially of primary hydroxyl groups include without limitation, 1,4-cyclohexane dimethanol (CHDM), UNOXOL™ diol from the Dow Chemical Company, 1,2,4-cyclohexanetrimethanol, 1,3,5-cyclohexanetrimethanol, 1,2,4,5-cyclohexanetetramethanol, and combinations thereof. UNOXOL™ diol is a mixture of cis, trans-1,3- and cis, trans-1,4-cyclohexane dimethanol. Examples of linear aliphatic polyols include without limitation, neopentyl glycol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2-butyl-2-ethyl-1,3-propanediol, 2-ethyl-2-isobutyl-1,3-propanediol, 1,4-butanediol, 1,5-pentanediol, 1,6-hexanediol, 2,2,4,4-tetramethyl-1,6-hexanediol, thiodiethanol, 2,4-diethyl-1,5-pentanediol, norbornene dimethanol, hydroxypivalyl hydroxypivalate, 1,10-decanediol, trimethylolethane, trimethylolpropane, pentaerythritol, and combinations thereof.

The aliphatic polycarbonate according to the present invention is an amorphous solid or viscous liquid at about 25° C., which can be dissolved in a common solvent such as butyl acetate and aromatic 100. The aliphatic polycarbonate described herein may be prepared by performing an ester exchange between a dialkyl, diaryl or alkylene carbonate and a mixture of aliphatic polyol compounds, in the presence of a catalyst customarily employed for an ester exchange reaction. Preferably dialkyl or diaryl carbonates are used. The reaction may be performed by melt, interfacial or solution polymerizations, as known in the art. In one to embodiment, melt polymerization is the process used for carrying out the ester exchange reaction. Reaction conditions are known in the art, for example as in US Patent Publication 2012/0041143 A1. The molecular weight of the aliphatic polycarbonate polymer can be adjusted by changing the molar ratio of the hydroxyl containing compounds and the dialkyl or diaryl carbonate. The appropriate molecular weight range of the polycarbonate according to the present invention depends on the use of the final polymer. Generally, the polycarbonate can have a number average molecular weight (Mn) of from 300 to 50,000. Preferably the Mn is from 1,000 to 20,000, more preferably from 1500 to 15,000, and more preferably from 2,000 to 10,000. The molecular weight is generally measured by a conventional gel permeation chromatography method. More specifically, molecular weights are determined by analysis on an Agilent 1100 Series Gel Permeation Chromatograph (GPC). Polymer samples are dissolved in THF, and 5 microliter aliquots are injected by the autosampler. The GPC uses two Polymer Labs PLgel 5 micron MIXED-D columns and a flow rate of 1 mL/min at 35° C. Sample detection is performed using a differential refractive index detector, and a polyethylene glycol standard is used for calibration.

The aliphatic polycarbonate may be selected from alkylene carbonates, diaryl carbonates, dialkyl carbonates, dioxolanones, hexanediol bis-chlorocarbonates, phosgene and urea. The alkylene carbonates include ethylene carbonate, trimethylene carbonate, 1,2-propylene carbonate, 5-methyl-1,3-dioxane-2-one, 1,2-butylene carbonate, 1,3-butylene carbonate, 1,2-pentylene carbonate, and the like. Moreover, dialkyl carbonates include dimethyl carbonate, diethyl carbonate, dipropyl carbonate, di-n-butyl carbonate, and the like and the diaryl carbonates include diphenyl carbonate.

Examples of suitable catalysts used to obtain the aliphatic polycarbonate include, but are not limited to, alkali metals such as lithium, sodium, potassium, rubidium, cesium, magnesium, calcium, strontium, barium, zinc, aluminum, titanium, cobalt, germanium, tin, lead, antimony, arsenic and alkali metal hydroxides or alkali metal alkoxides. As the metallic compounds, oxides, hydroxides, salts, alkoxides, organic compounds, and the like may be used. Of these catalysts, it is preferred to use titanium compounds such as titanium tetrabutoxide, titanium tetra-n-propoxide, titanium tetra-isopropoxide, and titanium 2-ethyl hexanoate, tin compounds such as di-n-butyltin dilaurate, di-n-butylin oxide, and dibutylin diacetate, lead compounds such as lead acetate and lead stearate.

The amount of catalyst is at least 0.0001 wt. %, or at least 0.001 wt. %, or at least 0.005 wt. %, or at least 0.01 wt. %, and up to 0.03 wt. %, or up to 0.025 wt. %, or up to 0.02 wt. %, or up to 0.015 wt. %, or up to 0.01 wt. %. Further examples of suitable amounts of catalyst include a range of from 0.0001 wt. % to 0.03 wt %, or 0.0001 wt. % to 0.025 wt. %, or 0.0001 wt. % to 0.02 wt. %, or 0.001 wt. % to 0.03 wt %, or 0.001 to 0.025 wt. %, or 0.001 to 0.02 wt. %, or 0.005 wt. % to 0.03 wt %, or 0.005 wt. % to 0.025 wt. %, or 0.005 to 0.02 wt. %. In each case, the weight percentages are based on the total weight of the aliphatic polyol compounds employed.

The aliphatic polycarbonate resin of the present invention can be formulated into a liquid coating composition comprising the aliphatic polycarbonate of the present invention, a crosslinker, organic solvents and a catalyst. The coating may further comprise additives and pigments commonly used in coating formulations, as well as additional polymeric binders, wetting additives and slipping agents. Additional polymer binders include without limitation, polyesters, epoxy resins, epoxy ester resins, acrylic resins, vinyl resins, solution vinyl resins, polyolefins (functionalized and un-functionalized) and polyolefin dispersions. Additional polymer binders are added at levels less than seventy percent (70%) by weight based upon solids. Optionally, other hydroxyl bearing resins, such as acrylic polyols and polyester polyols can be used as blending resins. Suitably, the content of these blending resins can be at a level that does not adversely affect the properties of the present invention. Examples of additional additives include without limitation, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations including one or more of the foregoing additives.

The liquid coating composition comprises from 99% to 30% solvent and from 1% to 70% solids, by weight based on total weight of the liquid coating composition. The term "solids" means the portion of material that will remain after the liquid portion, which serves as a carrier or vehicle for the solid content, has vaporized. The solids portion of the liquid coating composition comprises from 99% to 30% polymeric resin, by weight based on total solids and from 1% to 70% crosslinker, by weight based on total solids.

Suitable crosslinkers include without limitation, melamines, formaldehydes, phenolics, isocyanates (isocyanurates) and hydroxyalkylamides including without limitation, melamine formaldehyde, phenol formaldehyde, blocked isocyanate, non-bis-A phenolics, hexamethoxymethylmelamine, tetramethoxymethylbenzoguanamine, tetramethoxymethylurea, mixed butoxy/methoxy substituted melamines, hydroxyalkylamides and the like. Examples of melamines include the Cymel™ 300 series and Cymel™ 1100 series melamine crosslinkers from Cytec Surface Specialties. Examples of phenolic resins include Phenodur® resins from Cytec Industries. Suitable isocyanates include without limitation, isocyanurates of toluene diisocyanate, isocyanurates of 4,4'-diisocyanate, isocyanurates of isophorone diisocyanate, isocyanurates of 1,6-hexamethylene diisocyanate, 1, triphenylmethane 4,4',4"-triisocyanate, and polyisocyanates. Isocyanate terminated adducts of polyols may be formed by reacting more than one equivalent of a diisocyanate, with one equivalent of a polyol to form a higher molecular weight isocyanate prepolymer with a functionality of greater than 2. Examples include those isocyanate crosslinkers under the Desmodur™ and Mondur™ trade names from Bayer Material Science and those under the Tolonate™ trade name from Perstorp.

Catalysts for the hydroxyl and melamine reactions are well known in the art. Suitable catalysts include without limitation, p-toluenesulfonic acid, dodecylbenzene sulfonic (DDBSA) unblocked and blocked, dinonylnaphthalene sulfonic acid (DNNSA) and dinonylnaphthalene disulfonic acid (DNNDSA) such as Nacure™ 155, 5076, 1051, and 5225 catalysts sold by King Industries, BYK™-Catalysts sold by BYK-Chemie USA and Cycat™ catalysts sold by Cytec Surface Specialties.

The liquid coating compositions may include various additives ordinarily incorporated in compositions of this type. Examples of additional additives include, but are not limited to, gloss reducing additives, cure catalysts, flow and leveling agents, degassing additives, adhesion promoters, dispersion aids, flame-retardant agents, heat stabilizers, light stabilizers, antioxidants, plasticizers, antistatic agents, ultraviolet (UV) absorbers, lubricants or combinations including one or more of the foregoing additives.

Liquid coating compositions of the present invention can be un-pigmented transparent clear coats, or pigmented systems for primer, basecoat and topcoat applications. The pigment may be any typical organic or inorganic pigment. Several different pigments may be needed to achieve a desirable color for a particular application. Examples of suitable pigments include without limitation, titanium dioxide, barytes, clay, calcium carbonate, red iron oxide, CI Pigment Yellow 42, CI Pigment Blue 15, 15:1, 15:2, 15:3, 15:4 (copper phthalocyanines), CI Pigment Red 49:1, CI Pigment Red 57:1 and carbon black.

The resulting coating compositions can be applied onto a substrate using techniques known in the art; e.g. by spraying, draw-down, roll-coating. Examples of substrates that may be coated include without limitation, plastics, wood, metals such as aluminum, steel or galvanized sheeting, tin-plated steel, concrete, glass, composites, urethane elastomers, primed to (painted) substrates, and the like. The coatings can be cured at room temperature or at an elevated temperature in a forced air oven or with other types of heating sources.

The following examples are illustrative of the invention.

Experimental Methods: The experimental polycarbonate polyols were produced using the condensation reaction between dimethyl carbonate (DMC) and one or more diols, as indicated in the examples. The reaction proceeds with the distillation of the condensation product methanol. The DMC is starve-fed to the hot diol (approximately 150° C.) in the presence of 80 parts per million (ppm) of a standard tin or titanium catalyst. When the DMC is fully transferred and the distillate collection markedly slows, the stirring reaction mixture is heated to 200° C. with rapid stirring, and the reaction is continued until the targeted molecular weight is achieved.

Procedure for the Preparation of Master Batch Resin Solutions: The solid resin was placed into a glass jar and the solvent(s) was added. The lid was screwed on the jar immediately and a tape was placed around the lid. The jar was placed on rolling bars and was turned slowly until all the solids had been dissolved and a clear solution had formed. Procedure for the Preparation of Coating Formulations: A glass jar was charged with the components of the formulation. The jar was closed with a lid and put on rolling bars for at least 30 minutes, turning slowly.

The materials used in the Examples are shown in Table 1.

TABLE 1

Summary of materials used

| Material Name | Material Description | Source |
|---|---|---|
| Dynapol L952 | Solid Polyester | Evonik Industries |
| Dynapol LS 615 | Liquid Polyester | Evonik Industries |
| UNOXOL PC | Polycarbonate Polyol based upon 100% by weight UNOXOL ™ diol, Mn = 4400, 0.26% unreactive end groups | Produced in the lab |
| CHDM PC | Polycarbonate Polyol based upon 100% by weight CHDM, Mn = 4300, 8% unreactive end groups | Produced in the lab |
| 85/15 CHDM/BDO PC | Polycarbonate Polyol based upon an 85/15 weight ratio of CHDM/BDO, Mn = 4200, 20.5% unreactive end groups | Produced in the lab |
| 72/28 CHDM/BDO PC | Polycarbonate Polyol based upon a 72/28 weight ratio of CHDM/BDO, Mn = 4900, 9% unreactive end groups | Produced in the lab |
| Eternacoll UC-100 | Polycarbonate Polyol based upon CHDM | Ube |
| Eternacoll UM-90 | Polycarbonate Polyol based upon a CHDM/HDO mixture | Ube |
| Ravecarb 107 | Polycarbonate Polyol based upon a PDO/HDO mixture | Polimeri Europa |
| PPC-9.28-3 | Poly(Propylene Carbonate) Polyol, Mn = 2500 | Jinlong-CAS Chemical Co. Ltd. |
| Phenodur PR 411/75B | Phenolic resin (75% solids) | Cytec Industries |
| Phenodur VPR 1785/50 MP | Bis-A-free phenolic resin (50% solids) | Cytec Industries |
| Phenodur PR 285/55IB/B | Phenolic resin (55% solids) | Cytec Industries |
| Phenodur PR 516/60B | Bis-A-free phenolic resin (60% solids) | Cytec Industries |
| NaCure 5925 | Blocked sulfonic acid (25% solids) | King Industries |
| Dowanol PMA | Methoxypropyl acetate | The Dow Chemical Company |
| Solvesso 150 | Aromatic solvent | Exxon Mobil |
| Cyclohexanone | Solvent | Aldrich |
| Toluene | Solvent | Aldrich |

BDO is butanediol,
PDO is pentanediol and HDO is hexanediol.

Procedure for Application of Coating Formulations

A tin plate panel, provided by Rasselstein, having grade TS-245 standard finish, with approximately 10 cm to 20 cm size was cleaned with acetone or MEK and then dried. Care has to be taken that the passivation layer is not wiped off, as the lack of the passivation layer could cause wetting defects. About 3 grams of the coating formulations were applied to individually to a tin plate panel via a spiral drawdown bar (16 or 20) thereby coating one surface of the tin plate panel. Subsequently, the panel was cured at 200° C. for 10 or 12 minutes in a furnace or convection oven (with the exception of the 85/15 CHDM/BDO sample which was cured at 237.5° C.). The coated tin plate panels were then tested for coating thickness, wedge bend, MEK DR (methyl ethyl ketone double rub), and cross cut adhesion after sterilization according to the procedures described below.

Cross-Cut Adhesion

Cross-cut adhesion is measured according to ASTM-D 3359-08, Measuring adhesion by tape test, Method B., using an Erichsen cross-cut tester EPT 675R. This method provides the to procedure for assessing the adhesion of coating films to metallic substrates by applying and removing a tape (grade: TESA 4124 clear) over the cuts made in the film. Place the center of a piece of tape over the grid and in the area of the grid smooth into place by a finger. To ensure good contact with the film rub the tape firmly. Within 90±30 seconds of application, remove the tape by seizing the free end and rapidly (not jerked) pulling it off at as close to an angle of 180 degrees as possible. Inspect the grid area for removal of coating from the substrate or from a previous coating using the illuminated magnifier. Rate the adhesion in accordance with the following scale.

| | |
|---|---|
| 5B | The edges of the cuts are completely smooth; none of the squares of the lattice is detached. |
| 4B | Small flakes of the coating are detached at intersections; less than 5% of the area is affected. |
| 3B | Small flakes of the coating are detached along the edges and at intersections of cuts. The area affected is 5-15% of the lattice. |
| 2B | The coating has flaked along the edges and on parts of the squares. The area affected is 15-35% of the lattice. |
| 1B | The coating has flaked along the edges of cuts in large ribbons and whole squares have detached. The area affected is 35-65% of the lattice. |
| 0B | Flaking and detachment is worse than 1B |

Sterilization in Lactic Acid

One—10 cm by 6.5 cm piece of coated panel is immersed halfway in a solution of 2% lactic acid solution in a 600 mL beaker. The beaker is covered with aluminum foil and placed into a Tuttnauer EZ 10 Autoclave at 121 C for 30 minutes. After the 30 minutes, the autoclave is allowed to depressurize. The beaker is removed from the autoclave and the panel(s) is removed from the beaker, placed on a paper towel, and patted dry.

MEK Double Rub

The flat end of a hemispherical hammer having a weight of 1230±10 g was used. A normal tissue "VILEDA 3168" was bound around the hammer end. It was soaked with methyl ethyl ketone (MEK). The hammer was brought into contact with the coating, and moved forth-and-back over the whole coating, wherein one movement forth-and-back over the whole coating is considered one double rub. No additional pressure was applied onto the hammer. After every 10 double rubs, the tissue was re-soaked. The double rub step was repeated until the coating was rubbed off, i.e. at least a portion of the metal substrate was exposed. In the event that the double rub step reached 100 double rubs, the testing was terminated, and 100 double rubs were reported as the final results.

Wedge Bend

Wedge bend was measured via Gardner "COVERALL" Bend Tester IG 1125. The apparatus used for this test consists of two parts to convert it to a bending machine. A steel rod (mandrel) is mounted at the front of the base. The coated test panel of 100 mm width was flexed over the 3 mm rod mandrel; thus, the coating appears on the outside of the bend. The flexed panel was inserted in the wedge mandrel. The impactor, i.e. a metal weight, was raised to 7 inches height, and then dropped. The impactor is retrieved on its first bounce, and secured. The cylindrical fold in the panel was squeezed into a conical shape. The edge of the coated panel was rubbed with a solution of copper sulfate (mixture of 10 grams of copper sulfate, 90 grams of water and 3 grams of sulfuric acid). Anywhere the coating had been cracked; dark spots appeared, indicating failure. The length of the intact area along the length of the wedge bend, which is 100 mm, was measured in millimeters and expressed as percent pass.

Coating Thickness

Coating thickness was measured according to ASTM-D 1186-01, Non-destructive measurement of dry film thickness of non magnetic coatings applied to a ferrous base, using a PERMASCOPE D-211D, coating thickness gauge. The standard panel without any coating was used for calibration. The thickness of the coating of the coated panels were the average of 10 measurements, wherein each measurement of the thickness of the coating of the coated panels was measured using a probe for ferrous materials relative to the thickness of the coating of the standard panel, i.e. zero. The measured thickness was reported in microns.

Coating formulations were prepared with the compositions shown in Table 2. The properties of such coatings are shown in Table 3.

TABLE 2

Coating formulations

| | Coating Formulation Number | | | | | | | | | |
|---|---|---|---|---|---|---|---|---|---|---|
| | 1 | 2 | 3 | 4 | 5 | 6 | 7 | 8 | 9 | 10 |
| UNOXOL PC (wt %) | 0 | 27 | 0 | 0 | 0 | 0 | 0 | 0 | 0 | 0 |
| CHDM PC (wt %) | 16 | 0 | 0 | 0 | 0 | 0 | 0 | 0 | 0 | 0 |
| 85/15 CHDM/BDO PC (wt %) | 0 | 0 | 0 | 21 | 0 | 0 | 0 | 0 | 0 | 0 |
| 72/28 CHDM/BDO PC (wt %) | 0 | 0 | 27 | 0 | 0 | 0 | 0 | 0 | 0 | 0 |
| Eternacoll UC-100 (wt %) | 0 | 0 | 0 | 0 | 16 | 0 | 0 | 0 | 0 | 0 |
| Eternacoll UM-90 (wt %) | 0 | 0 | 0 | 0 | 0 | 8 | 0 | 0 | 0 | 0 |
| Ravecarb 107 (wt %) | 0 | 0 | 0 | 0 | 0 | 0 | 8 | 0 | 0 | 0 |
| PPC-9.28-3 (wt %) | 0 | 0 | 0 | 0 | 0 | 0 | 0 | 16 | 0 | 0 |
| Dynapol L952 (wt %) | 0 | 0 | 0 | 0 | 0 | 0 | 0 | 0 | 0 | 22 |

TABLE 2-continued

Coating formulations

| | Coating Formulation Number | | | | | | | | | |
|---|---|---|---|---|---|---|---|---|---|---|
| | 1 | 2 | 3 | 4 | 5 | 6 | 7 | 8 | 9 | 10 |
| Dynapol LS 615 (wt %) | 0 | 0 | 0 | 0 | 0 | 0 | 0 | 0 | 28 | 0 |
| Phenodur PR 411/75B (wt %) | 0 | 0 | 0 | 0 | 0 | 0 | 0 | 0 | 16 | 12 |
| Phenodur VPR 1785/50 MP (wt %) | 48 | 0 | 0 | 0 | 48 | 24 | 24 | 48 | 0 | 0 |
| Phenodur PR 285/55IB/B (wt %) | 0 | 21 | 21 | 0 | 0 | 0 | 0 | 0 | 0 | 0 |
| Phenodur PR 516/60B (wt %) | 0 | 0 | 0 | 15 | 0 | 0 | 0 | 0 | 0 | 0 |
| NaCure 5925 (wt %) | 0.5 | 7.6 | 7.6 | 1.8 | 0.5 | 0.4 | 0.4 | 0.1 | 2.4 | 1.8 |
| Dowanol PMA (wt %) | 0 | 0 | 0 | 0 | 0 | 0 | 0 | 36 | 27 | 26 |
| Solvesso 150 (wt %) | 0 | 0 | 0 | 0 | 0 | 0 | 0 | 0 | 13 | 38 |
| Cyclohexanone (wt %) | 0 | 0 | 0 | 0 | 0 | 0 | 0 | 14 | 0 | 0 |
| Toluene (wt %) | 36 | 45 | 45 | 63 | 36 | 68 | 68 | 0 | 0 | 0 |
| Resin:Crosslinker ratio (solids basis) | 40:60 | 70:30 | 70:30 | 70:30 | 40:60 | 40:60 | 40:60 | 40:60 | 70:30 | 70:30 |
| Total Solids (%) | 24 | 38 | 38 | 30 | 40 | 20 | 20 | 40 | 40 | 31 |

TABLE 3

Coating formulation properties

| Coating | Polymer | Cure Time (min) | Lactic Acid Retort | MEK Double Rub | Wedge Bend (% Pass) | Thickness (microns) |
|---|---|---|---|---|---|---|
| 1 | CHDM | 10 | 5B | >100 | 91 | 8.7 |
| 2 | UNOXOL | 10 | 5B | >100 | 96 | 12.2 |
| 3 | 85/15 CHDM/BDO | 10 | 5B | >100 | 98 | 10.7 |
| 4 | 72/28 CHDM/BDO | 10 | 4B | 92 | 87 | 11.8 |
| 5 | UC-100 | 10 | 5B | 55 | 76 | 9.0 |
| 6 | UM-90 | 10 | 5B | >100 | 76 | 5.7 |
| 7 | Ravecarb 107 | 10 | 0B | 75 | 74 | 6.7 |
| 8 | PPC-9.28-3 | 10 | 1B | 24 | 83 | |
| 9 | Dynapol LS 615 | 12 | 0B | 12 | 100 | 5.5 |
| 10 | Dynapol L952 | 12 | 5B | 10 | 100 | 4.9 |

Table 3 shows that coatings made from formulations 1-6 exhibit superior properties to coatings made from comparative formulations 7-10.

What is claimed is:

1. A liquid polycarbonate coating composition comprising an aliphatic polycarbonate resin and a cross linking compound, said aliphatic polycarbonate resin being derived from, in the presence of a catalyst, an aliphatic polyol which consists of
   (a) from 70 to 100% by weight of the aliphatic polyol, one or more cycloaliphatic polyols and
   (b) from 0 to 30% by weight of the aliphatic polyol, one or more linear aliphatic polyols;
   wherein the aliphatic polyol comprises no more than 2.5% of polyols which comprise secondary hydroxyl groups, by weight based on the aliphatic polyol; and
   wherein the aliphatic polycarbonate resin has a number average molecular weight (Mn) of from 2000 to 10,000 and the liquid polycarbonate coating is an amorphous thermosetting composition.

2. The coating composition of claim 1 wherein the aliphatic polyol consists of
   (a) from 85 to 100% by weight of the aliphatic polyol, one or more cycloaliphatic polyols and
   (b) from 0 to 15% by weight of the aliphatic polyol, one or more linear aliphatic polyols;
   wherein the aliphatic polyols comprises no more than 2.5% of polyols which comprise secondary hydroxyl groups, buy weight based on the aliphatic polyol.

3. The coating composition of claim 1 wherein the cross linking compound comprises one or more of melamines, formaldheydes, phenolics, isocyanates, isocyanurates, hydroxyalylamides and mixtures thereof.

4. The coating composition of claim 1 wherein the cycloaliphatic primary polyols are selected from the group consisting of 1,4-cyclohexane dimethanol, cis/trans-1,3-cyclohexane dimethanol, cis/trans-1,4-cyclohexane dimethanol, 1,2,4-cyclohexanetrimethanol, 1,3,5-cyclohexanetrimethanol, 1,2,4,5-cyclohexanetetramethanol, and combinations thereof.

5. The coating composition of claim 1 wherein the linear aliphatic polyols are selected from the group consisting of neopentyl glycol, ethylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, 1,3-propanediol, 2-butyl-2-ethyl-1,3-propanediol, 2-ethyl-2-isobutyl-1,3-propanediol, 1,4-butanediol, 1,5-pentanediol, 1,6-hexanediol, 2,2,4,4-tetramethyl-1,6-hexanediol, thiodiethanol, 2,4-diethyl-1,5-pentanediol, norbornene dimethanol, hydroxypivalyl hydroxypivalate, 1,10-decanediol, trimethylolethane, trimethylolpropane, pentaerythritol, and combinations thereof.

6. The coating composition of claim 1 further comprising one or more polymers selected from the group consisting of polyesters, epoxy resins, epoxy ester resins, acrylic resins, vinyl resins, solution vinyl resins, polyolefins, polyolefin dispersions and mixtures thereof.

7. A method of coating a substrate comprising:
   (i) preparing a liquid polycarbonate coating composition comprising an aliphatic polycarbonate resin and a cross linking compound, said aliphatic polycarbonate resin being derived from, in the presence of a catalyst, an aliphatic polyol which consists of (a) from 70 to 100% by weight of the aliphatic polyol, one or more cycloaliphatic polyols and (b) from 0 to 30% by weight of the aliphatic polyol, one or more linear aliphatic polyols;
   wherein the aliphatic polyols comprises no more than 2.5% of polyols which comprise secondary hydroxyl groups, buy weight based on the aliphatic polyol; and
   wherein the aliphatic polycarbonate resin has a number average molecular weight (Mn) of from 2000 to 10,000 and the liquid polycarbonate coating is an amorphous thermosetting composition;

(ii) applying the liquid polycarbonate coating composition onto a substrate; and
(iii) curing the coating composition.

8. The method of claim 7 wherein the substrate is plastic, wood, metal, concrete, glass, a composite material, urethane elastomer, or a painted surface.

9. A coated article made by the process of claim 7.

10. The coated article of claim 9 wherein the article is a beverage or food container and the coating is in between the substrate and the beverage or food.

11. The coating composition of claim 1 wherein the aliphatic polyol comprises no more than 1% of polyols which comprise secondary hydroxyl groups, by weight based on the aliphatic polyol.

12. The coating composition of claim 1 wherein the aliphatic polyol comprises no polyols which comprise secondary hydroxyl groups.

\* \* \* \* \*